Figure 1:
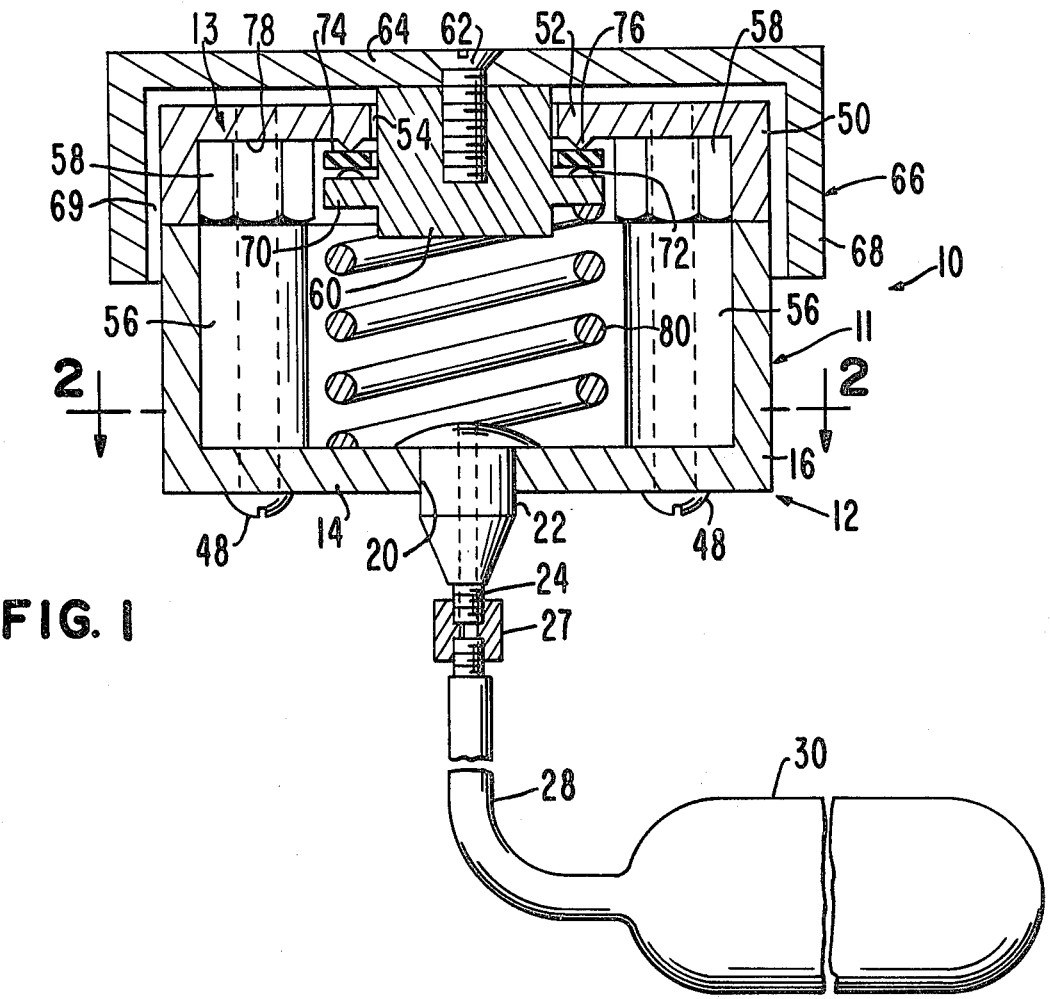

United States Patent [19]

Paulson

[11] 4,342,347
[45] Aug. 3, 1982

[54] PRESSURE DUMP VALVE

[76] Inventor: Eugene K. Paulson, 351 Rosemont Dr., Santa Clara, Calif. 95051

[21] Appl. No.: 161,463

[22] Filed: Jun. 20, 1980

[51] Int. Cl.³ .................... B65B 3/04; F16K 15/20
[52] U.S. Cl. .................................. 141/98; 137/228; 141/114; 141/392; 251/339
[58] Field of Search .................. 137/226, 228, 230; 251/321, 322, 339; 141/98, 114, 392

[56] References Cited

U.S. PATENT DOCUMENTS 3,239,192  3/1966  Totten ............................ 251/339

FOREIGN PATENT DOCUMENTS 347172  4/1931  United Kingdom .............. 137/228

Primary Examiner—Frederick R. Schmidt
Attorney, Agent, or Firm—John L. McGannon

[57] ABSTRACT

A fluid valve having a generally cylindrical, hollow body provided with aligned openings in the opposed end walls thereof, one of the openings shiftably receiving a valve member and the other opening adapted to be coupled to a tube leading to a vessel to be pressurized. A coil spring in the body biases the valve member to a closed position against a valve seat carried by the adjacent end wall, and the valve member has a cap provided with a skirt surrounding the sidewall of the body so that the valve member can be opened by manually depressing the cap relative to the body. A second valve is coupled with the body so that a fluid under pressure can be directed into the body and thereby a vessel to be pressurized when the tube leading to the vessel is coupled to the other opening of the body. The body is formed in two parts to facilitate manufacture and assembly.

5 Claims, 2 Drawing Figures

PRESSURE DUMP VALVE

The present invention relates to improvements in fluid valves and, more particularly, to a fluid valve which can be held in the hand and opened from a closed position to permit rapid deflation of an inflated vessel coupled with the valve.

BACKGROUND OF THE INVENTION

In the plumbing of new homes or buildings, vertical sewer lines must be tested for leaks before the plumbing work can be considered completed. A typical way of testing for such leaks is to place an inflatable bladder in a clean-out of the sewer line near the ground or basement level of the home or building. Then the bladder is inflated to block the sewer line, following which the sewer line above the bladder is filled with water to determine leaks at the joints along the sewer line.

In the past, bladders of this type have been inflated with a conventional, hand-actuated tire pump with the control valve connected to the pump being on the bladder itself. To deflate the bladder after the leak tests have been completed, a workman has had to manually open the valve by depressing the valve stem or otherwise. This causes a slow deflation of the bladder and this is followed by a sudden rush of the water out of the clean-out as the deflating bladder commences to unblock the sewer line. The rushing water usually splashes onto the workman, causing the clothing of the workman to get wet. For this reason, a need has arisen for an improved valve which can permit inflation and rapid deflation of the bladder of the type described without causing a water splashing action when the valve deflates.

SUMMARY OF THE INVENTION

The present invention satisfies the aforesaid need by providing an improved valve which can be hand-held and actuated to quickly deflate a pressurized vessel, such as a bladder of the aforesaid character If such a bladder is used with the valve, the bladder can be safely deflated while permitting a workman operating the valve to stand sufficiently clear of the bladder so as not to get wet by water splashing through the sewer line opening in which the bladder is disposed. To this end, the valve of the present invention is comprised of a cylindrical body having openings through a pair of end walls thereof, one opening receiving a shiftable valve member and the other opening adapted to be coupled to a tube leading to the vessel to be pressurized. A spring in the body biases the valve member against a valve seat on the inner surface of one end wall of the body to close the valve itself, yet a cap on the valve member can be immediately depressed by the hand to allow air or other fluid under pressure in the pressurized vessel to immediately escape through the valve body and past the valve member through the opening in the first wall.

The primary object of this invention is to provide an improved fluid valve which permits a vessel to be pressurized so that, when the valve is opened, it permits the pressurized vessel to immediately lose the fluid pressure therein yet the valve can be operated in one hand and can be of a simple and rugged in construction and can be produced at minimum cost.

Other objects of this invention will become apparent as the following specification progresses, reference being had to the accompanying drawing for an illustration of the invention.

IN THE DRAWING

Figure 2:
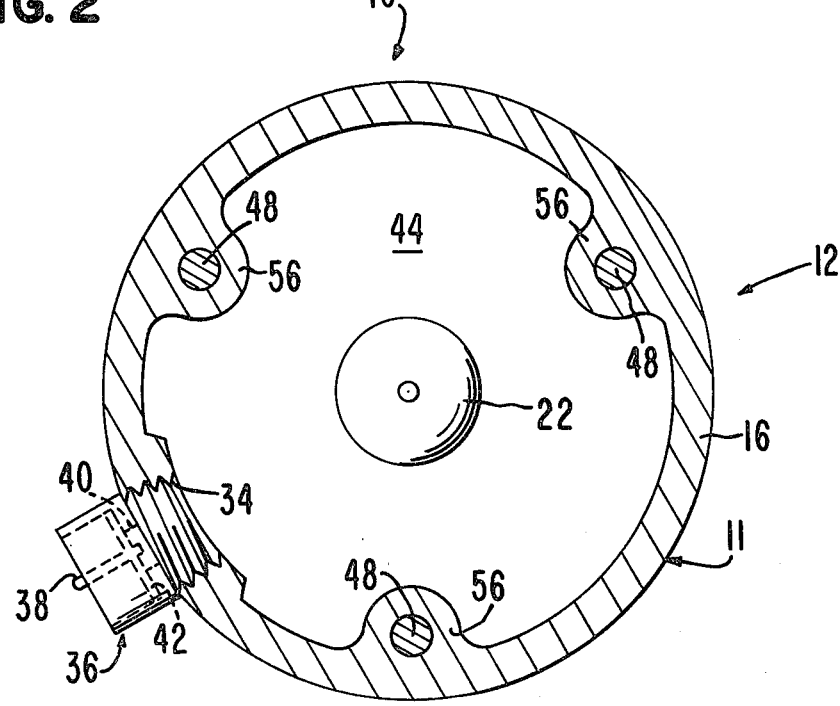

FIG. 1 is a vertical section through the valve of the present invention, showing the way it is attached to a bladder of the type for blocking a sewage line for testing purposes; and FIG. 2 is a cross-sectional view taken along line 2—2 of FIG. 1.

The valve of the present invention is broadly denoted by the numeral 10 and is formed of a hollow body 12 formed of two cup-shaped parts 11 and 13. Part 11 has a circular end wall 14 and a generally cylindrical outer sidewall 16 integral with end wall 14 and extending laterally from end wall 14 near its circular outer periphery. Wall 14 has a central opening 20 through which a tubular stem or sleeve 22 is press-fitted. Sleeve 22 has a threaded end 24 to threadably receive an internally threaded connector 27 rotatably mounted on the outer end of a tube 28 coupled with a vessel to be pressurized. For purposes of illustration, the vessel comprises a bladder 30, of the type adapted to be placed in a sewer line to block such line for test purposes.

Sidewall 16 of part 11 has a side opening 34 (FIG. 2) which threadably receives a valve 36 of the type having a valve stem 38 and a valve member 40 which engages a valve seat 42 when valve stem is in the position shown in FIG. 2. A fluid, such as air, under pressure, can be admitted to the interior 44 (FIG. 2) of body 12 when valve stem 38 is depressed to unseat valve member 40. When interior 44 is pressurized, and if tube 28 is coupled with body 12 in fluid communication with sleeve 22, then bladder 30 will be inflated by the fluid under pressure.

The other part 13 of body 12 is secured by machine screws 48 to upper margin of sidewall 16 of body 12. To this end, part 13 has a cylindrical sidewall 50 of the same diameter as sidewall 16 and a circular end wall 52 integral with sidewall 50 and provided with a central opening 54 as shown in FIG. 1. Sidewall 16 has tubular bosses 56 (FIG. 2) integral with part 11 which receive machine screws 48; similarly, part 13 has tubular bosses 58 which threadably receive the upper ends of machine screws 48 for interconnecting parts 11 and 13.

Central opening 54 in end wall 52 shiftably receives a cylindrical, solid valve member 60 secured by a flat head machine screw 62 to the end wall 64 of a cylindrical actuator member or cap 66 having a cylindrical outer skirt 68 which embraces sidewalls 16 and 50 of parts 11 and 13, respectively.

Valve member 60 has an annular flange 70 integral therewith and concentric to the central axis of valve member 60. Flange 70 has an annular rib 72 on its upper surface for bearing against a resilient, annular seal 74, the latter, in turn, being in engagement with an annular, tranversely V-shaped rib 76 on the bottom surface 78 of end wall 52 of part 13. A coil spring 80, normally under compression, engages the inner surface of wall 14 and biases valve member 60 away from part 11 such that rib 72 engages seal 74, and seal 74 engages rib 76. Thus, valve member 60 is closed when it is in the position of FIG. 1. Valve member 60 is spaced inwardly from the surface of end wall 52 which defines opening 54 so that, when the valve is opened, fluid under pressure within the interior 44 of body 12 can escape and pass through opening 54, then along the inner surface of end wall 64 of cap 66 and then through the gap 69 between sidewalls 16 and 50 and skirt 68. The air can then escape to the atmosphere.

In use, valve 10 is especially adapted to inflate bladder 30 when the bladder is inserted into the sewage line. This typically occurs when a new house is being built and it is necessary to determine leaks in the vertical sewage line installed in the house. Bladder 30 in a deflated condition is placed in a clean-out of the sewer line, near the ground level or basement level of the line. Then the bladder is inflated to block the sewer line. Finally, the sewer line above the inflated bladder is filled with water to test for leaks along the sewer line.

Using the present invention, an air hose is placed over valve 36 and air under pressure is directed into the valve, into body 12 and through tube 28, and then into bladder 30 to inflate the bladder sufficiently to cause it to block the sewer line. Then the air line is removed from valve 36 and water is put into the sewer line above the bladder and the water remains there for a period of time to assure that there are no leaks or, if there are leaks, the positions of such leaks.

When it is desired to deflate the valve after the test, cap 66 is depressed by gripping valve 10 and pressing the cap toward body 12 to cause valve member 60 to unseat from rib 76. This causes air in the bladder to rapidly leave through opening 54, along the inner surface of top wall 64, and through gap 69. This quickly and completely causes deflation of the bladder in a relatively short time and allows the bladder to thereafter be removed from the sewer line. Because the bladder deflates so quickly, the bladder will unblock the sewer line before the water above the sewer line can jet out of the line. This assures that the water will flow substantially uniformly past the hole from which the bladder was removed without spraying or splashing on a workman handling the bladder.

While valve 10 has been shown as usable with bladder 30 for sewer line test purposes, it is clear that the valve is suitable for a wide variety of uses especially where a confined region or vessel is to be pressurized with a fluid, such as air, under pressure and then released after the purposes of the pressurization has been achieved. Valve 10 is simple and rugged in construction, can be readily assembled, and is small enough so that it can be held in the hand. It can also be made of abrasion resistant material and can be cheaply made in molding operation to minimize costs without sacrificing strength and durability.

I claim:

1. A fluid valve for providing filling or rapid discharge of a pressurized vessel comprising: a hollow body having a wall provided with a first opening therethrough and an internal valve seat surrounding the opening, the interior space of said body being generally cylindrical and having a pair of opposed ends, said opening being at one end of and communicating directly with said space; a valve member shiftably received within and extending through the first opening and having a flange moveable toward the valve seat in valve closing relationship with respect thereto, the first opening and the valve member defining a fluid flow passage; means coupled with the valve member for biasing the flange into valve closing relationship with the valve seat, said body having a second opening at the opposite end of and communicating directly with said space, whereby the second opening can receive means for connecting the same to a vessel to be pressurized; and valve means coupled with the body for permitting a fluid under pressure to be directed into the body and to pressurize the vessel when the vessel is connected with the second opening of the body and when the flange is in valve closing relationship with respect to the valve seat, said body being free of restrictive fluid flow passages between said space and said first and second openings; and including an actuating cap secured to the valve member exteriorly of the body, said cap including an end wall adjacent to said wall of the body and a skirt secured to the end wall, the skirt surrounding and being spaced from a portion of the body, whereby when said cap is depressed, said first opening is opened when it is desired to depressurize said vessel.

2. A valve as set forth in claim 1, wherein the bias means includes a coil spring within the body.

3. A valve as set forth in claim 1, wherein the valve seat includes an annular rib on said wall surrounding said first opening.

4. A valve as set forth in claim 1, wherein the body has a pair of separable parts, one of the parts having the first opening therein, the other part having said second opening, and means interconnecting the parts.

5. A valve as set forth in claim 1, wherein is included an inflatable bladder for insertion into a sewer line, and means placing the bladder in fluid communication with said second opening.

* * * * *